US010851958B2

(12) United States Patent
Gromfeld

(10) Patent No.: US 10,851,958 B2
(45) Date of Patent: Dec. 1, 2020

(54) MOTOR VEHICLE LIGHTING MODULE, AND LIGHTING AND/OR SIGNALLING DEVICE PROVIDED WITH SUCH A MODULE

(71) Applicant: VALEO VISION, Bobigny (FR)

(72) Inventor: Yves Gromfeld, Angers (FR)

(73) Assignee: VALEO VISION, Bobigny (FR)

( * ) Notice: Subject to any disclaimer, the term of this patent is extended or adjusted under 35 U.S.C. 154(b) by 4 days.

(21) Appl. No.: 16/263,526

(22) Filed: Jan. 31, 2019

(65) Prior Publication Data
US 2019/0234571 A1  Aug. 1, 2019

(30) Foreign Application Priority Data

Jan. 31, 2018  (FR) ...................... 18 50800

(51) Int. Cl.
*F21S 41/24* (2018.01)
*F21S 41/141* (2018.01)
*B60Q 1/04* (2006.01)
*G02B 27/30* (2006.01)
*F21V 8/00* (2006.01)
(Continued)

(52) U.S. Cl.
CPC ................. *F21S 41/24* (2018.01); *B60Q 1/04* (2013.01); *F21S 41/141* (2018.01); *F21S 41/143* (2018.01); *F21S 41/153* (2018.01); *F21S 41/255* (2018.01); *F21S 41/27* (2018.01); *F21S 41/285* (2018.01); *F21S 41/663* (2018.01); *G02B 6/0055* (2013.01); *G02B 27/30* (2013.01)

(58) Field of Classification Search
CPC .......... F21S 41/24; F21S 41/663; F21S 41/27; F21S 41/143; F21S 41/255; F21S 41/153; F21S 41/141; F21S 41/285
See application file for complete search history.

(56) References Cited

U.S. PATENT DOCUMENTS

2009/0073710 A1* 3/2009 Sormani ................ F21S 41/24
                                                                                362/509
2017/0038023 A1  2/2017 Gromfeld
2017/0184267 A1  6/2017 Courcier

FOREIGN PATENT DOCUMENTS

| AT | 518552 A4 | 11/2017 |
| CN | 107131462 A | 9/2017 |
| CN | 206592963 U | 10/2017 |
| CN | 107525005 A | 12/2017 |

(Continued)

OTHER PUBLICATIONS

French Preliminary Search Report dated Oct. 4, 2018 in French Application 18 50800, filed on Jan. 31, 2018 (with English Translation of Categories of Cited Documents).

*Primary Examiner* — Anne M Hines
(74) *Attorney, Agent, or Firm* — Oblon, McClelland, Maier & Neustadt, L.L.P.

(57) ABSTRACT

The invention concerns a lighting module for motor vehicles, including at least one first row of first illumination units configured to produce a first exit beam, each first illumination unit including a first light source and a first optical element configured to produce a first unitary beam from light rays coming from the first light source, characterized in that the first optical element of each of the first illumination units is configured to produce: a first total internal reflection of the rays coming from the first light source so as to form a reflected beam of collimated rays; a second total internal reflection of the collimated rays so as to generate the first unitary beam.

20 Claims, 4 Drawing Sheets

Figure 1:
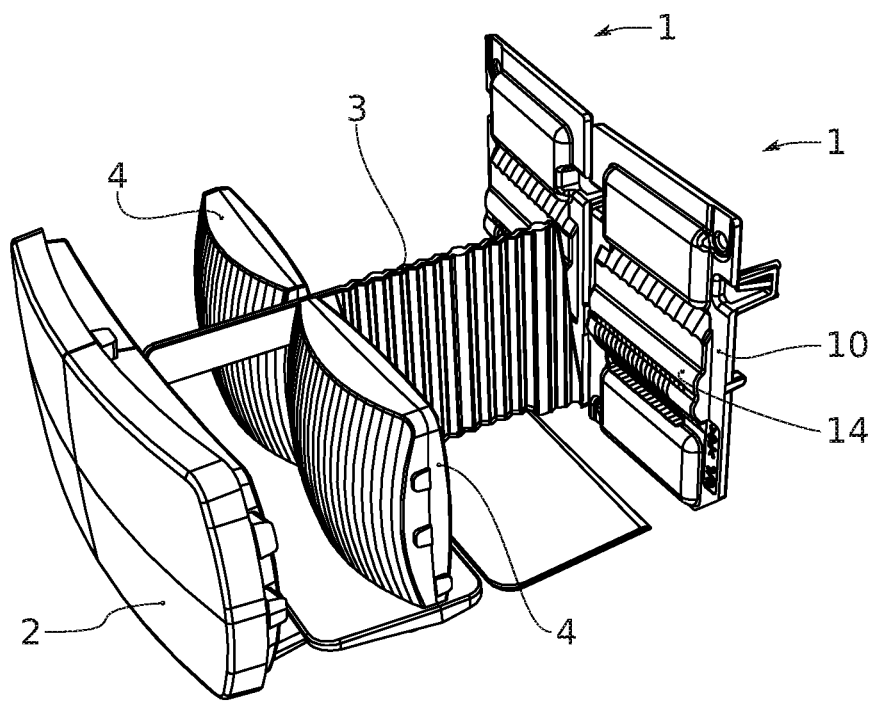

(51) Int. Cl.
*F21S 41/27* (2018.01)
*F21S 41/143* (2018.01)
*F21S 41/20* (2018.01)
*F21S 41/663* (2018.01)
*F21S 41/255* (2018.01)
*F21S 41/153* (2018.01)

(56) References Cited

FOREIGN PATENT DOCUMENTS

EP        3 128 226 A1   2/2017
WO   WO 2016/005409 A1   1/2016

* cited by examiner

MOTOR VEHICLE LIGHTING MODULE, AND LIGHTING AND/OR SIGNALLING DEVICE PROVIDED WITH SUCH A MODULE

The present invention relates in particular to a motor vehicle lighting module and to a lighting and/or signalling device provided with such a module.

A preferred application concerns the automotive industry, for equipping vehicles, in particular for the production of devices adapted to emit light beams, also known as lighting and/or signalling functions, generally complying with regulations. For example, the invention can enable the production of a segmented type light beam, in particular for signalling and/or participation in lighting functions at the front of a vehicle. It may be used to produce a near field beam. A segmented beam is a beam the projection of which forms a mark made up of beam segments, each segment being adapted to be lit independently.

The lighting and/or signalling lights of motor vehicles are lighting devices that comprise one or more light sources and an outer lens that closes the light. In simplified terms, the light source emits light rays to form a light beam that is directed toward the outer lens that transmits the light to the exterior of the vehicle in order to produce a patch of light. These functions must comply with regulations in terms of luminous intensity and angles of visibility in particular. Known lighting and signalling modules have until now been adapted to emit for example:

- a low beam, directed downward, sometimes also termed a dipped beam and used when other vehicles are present on the carriageway;
- a high beam with no cut-off, characterized by maximum illumination on the axis of the vehicle;
- a fog beam, characterized by a flat cut-off and very wide illumination;
- a signalling beam for travelling in towns, also known as a town lamp.

Technologies have recently been developed enabling production of a pixelated beam to produce lighting functions. There is known in particular from the published patent EP 2306075 A2 a lighting device including a plurality of light sources consisting of light-emitting diodes each emitting in the direction of an optical element in the form of a waveguide an exit diopter of which projects an individual beam in front of the vehicle. A plurality of illumination units is formed in this way that can be controlled so as to produce the required beam shapes.

However, for some beams, and in particular for the low beam lights, a specific luminous distribution is required that existing lighting modules do not succeed in achieving.

The present invention aims to remedy at least in part the disadvantages of the current techniques.

In one aspect, the present invention concerns a lighting module for motor vehicles, configured to produce an exit beam, comprising at least one first row of first illumination units configured to produce a first exit beam, each first illumination unit comprising a first light source and a first optical element configured to produce a first unitary beam from light rays coming from the first light source, characterized in that the first optical element of each of the first illumination units is configured to produce:

- a first total internal reflection of the rays coming from the first light source so as to form a reflected beam of collimated rays;
- a second total internal reflection of the collimated rays so as to generate the first unitary beam.

In another aspect, the present invention also concerns a motor vehicle lighting and/or signalling device equipped with at least one of the aforementioned lighting modules, and preferably at least two modules.

The first exit beam may advantageously effectively complement another beam, or even a plurality of beams.

The present invention also concerns a vehicle equipped with at least one module and/or one device according to the present invention. In particular, two devices spaced laterally at the front of the vehicle may be used.

According to one particularly advantageous embodiment, the first optical element comprises a waveguide configured to produce the first internal reflection and the second internal reflection. The guide is advantageously followed by a lens defining the exit from the optical element.

In this way, the optical processing with double total internal reflection is performed in a single optical component.

The guide advantageously comprises a first reflection surface receiving the rays coming from the first light source from an entry diopter of the guide and producing the first total internal reflection in the direction of a second reflection surface receiving the collimated rays and producing the second total internal reflection to generate the first unitary beam.

The first surface and the second surface are optionally offset in a heightwise direction of the module.

Without impacting the lateral overall size of the module, this arrangement procures a path of the light rays in the guide that is sufficiently long to undergo the two reflections.

The first surface is preferably situated above the second surface in the heightwise direction of the module.

In one nonlimiting instance, the second reflection surface is a continuous surface. It preferably has a curvature with a constant radius.

In one nonlimiting embodiment, the first optical elements together form a monobloc component made from a single material.

The continuous surface is advantageously common to the guides of each of the first illumination units.

This surface may preferably correspond to a guide edge surface that extends laterally in a manner common to all the illumination units.

According to one example, the second internal reflection is configured to spread the first unitary beam in a lateral direction perpendicular to a heightwise direction of the module.

This limits the effect of discrete unitary beams tending to isolate the unitary beams projected from one another so that less illuminated transition zones are visible. To the contrary, the invention produces a sufficient overlap of the unitary beams in the lateral direction so that the transition between them is smoothed.

The second internal reflection is possibly configured to generate a decrease of brightness toward the bottom of the first unitary beam.

By forming a near field beam this arrangement is particularly advantageous when the exit beam participates in a low beam function. As explained in detail later, in a situation of this kind the aim is to reduce the illumination closest to the vehicle and to increase it toward the cut-off zone. While such a variation of luminous intensity is currently impossible using segmented beams, the present invention offers optical processing in two reflection phases that makes possible this variation of the illumination intensity in the heightwise direction of a beam.

The first exit beam is advantageously a near field beam of a low beam light.

In one preferred embodiment, the module comprises a second row of second illumination units configured to produce a second exit beam, each second illumination unit comprising a second light source and a second optical element configured to produce a second unitary beam from light rays coming from the second light source.

It is therefore possible, within the same module, to produce or to participate in producing another lighting function or to produce or to participate in producing a beam complementary to the first exit beam generated by the first illumination unit.

The width of the first unitary beam is preferably equal to twice the width of the second unitary beams.

This arrangement reduces the number of light sources to be used for the first exit beam and preserves a higher resolution for the second beam.

The second exit beam is optionally a cut-off beam of the low beam light.

This context advantageously corresponds to the situation referred to above in which the first exit beam is a near field beam intended to be mostly or totally projected below a cut-off line and in which the second exit beam is a complementary cut-off beam so that the resultant of the two beams forms a low beam light function.

The module optionally also comprises at least one third row of third illumination units configured to produce a third exit beam, each third illumination unit comprising a third light source and a third optical element configured to produce a third unitary beam from light rays coming from the third light source. The third exit beam is preferably a high beam top-up. This third beam may be projected simultaneously with the first exit beam, and possibly the second exit beam, so as to produce illumination more extended in the heightwise direction in the high beam light function. The first exit beam may be used to light the near portion of the road relative to the vehicle while the third exit beam lights the part situated above the cut-off line. The second beam may complete the illumination. The invention may feature a plurality of third rows of third illumination units each configured to produce a third exit beam; adding rows enables the resulting illumination height of the third beams to be increased.

The module advantageously comprises a control unit adapted to activate and/or to deactivate and/or to modify the luminous intensity of each of the first light sources and where applicable the second light sources and/or the third light sources.

In one preferred embodiment, the module is configured to project a light beam in front of a motor vehicle.

Figure 2:
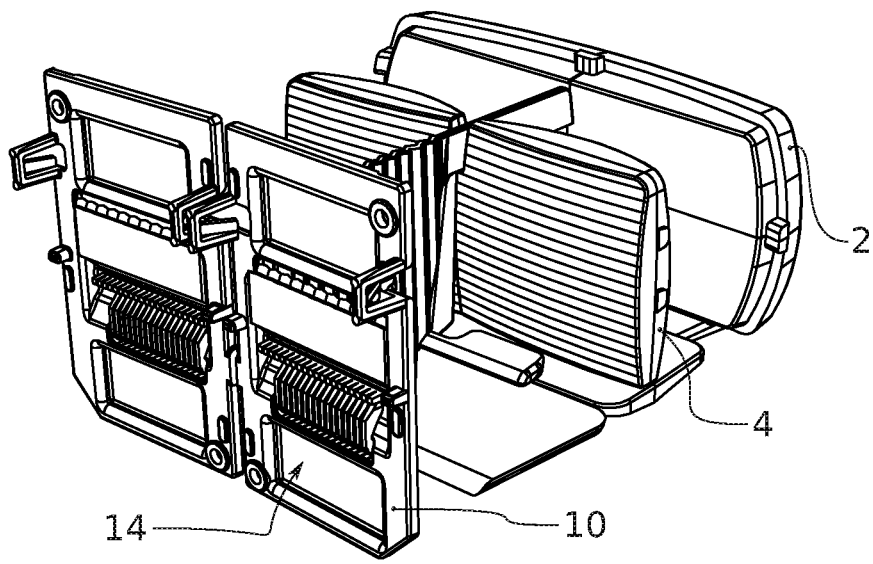
Figure 3:
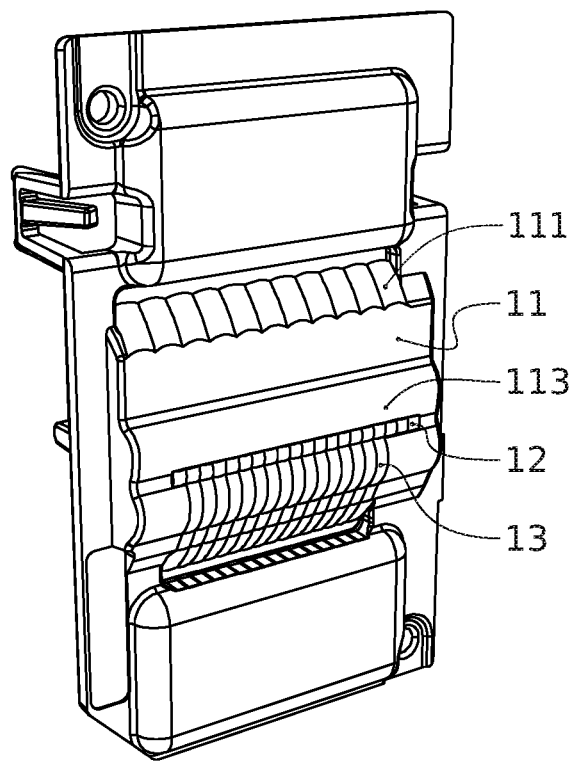
Figure 4:
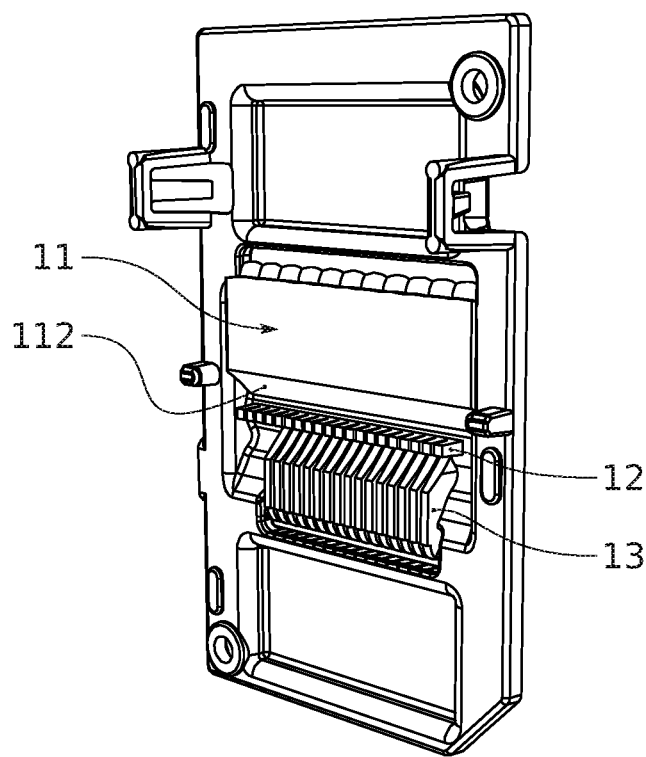
Figure 5:
Figure 5:
Figure 5:
Figure 6:
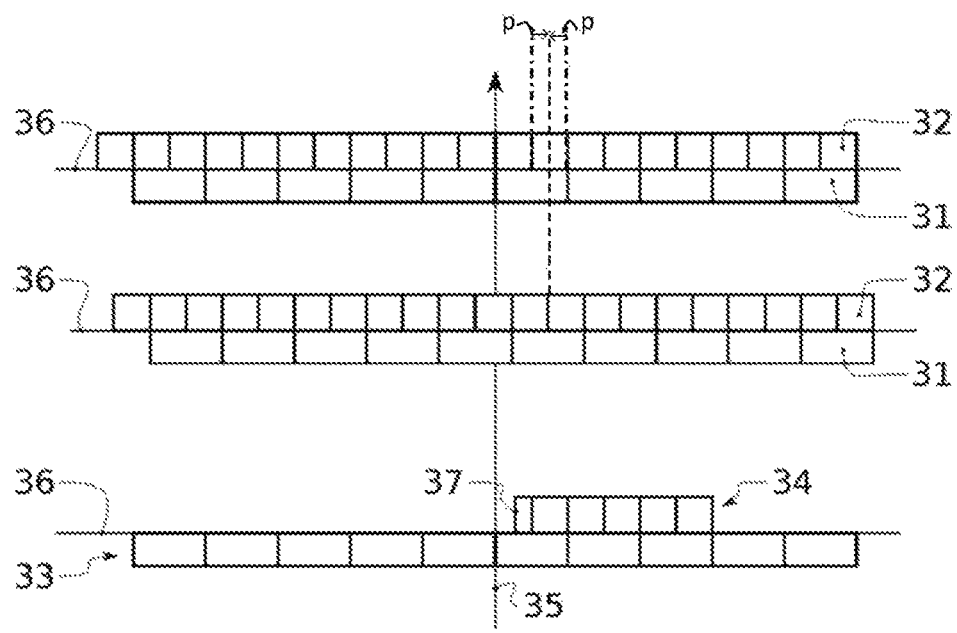
Figure 7:
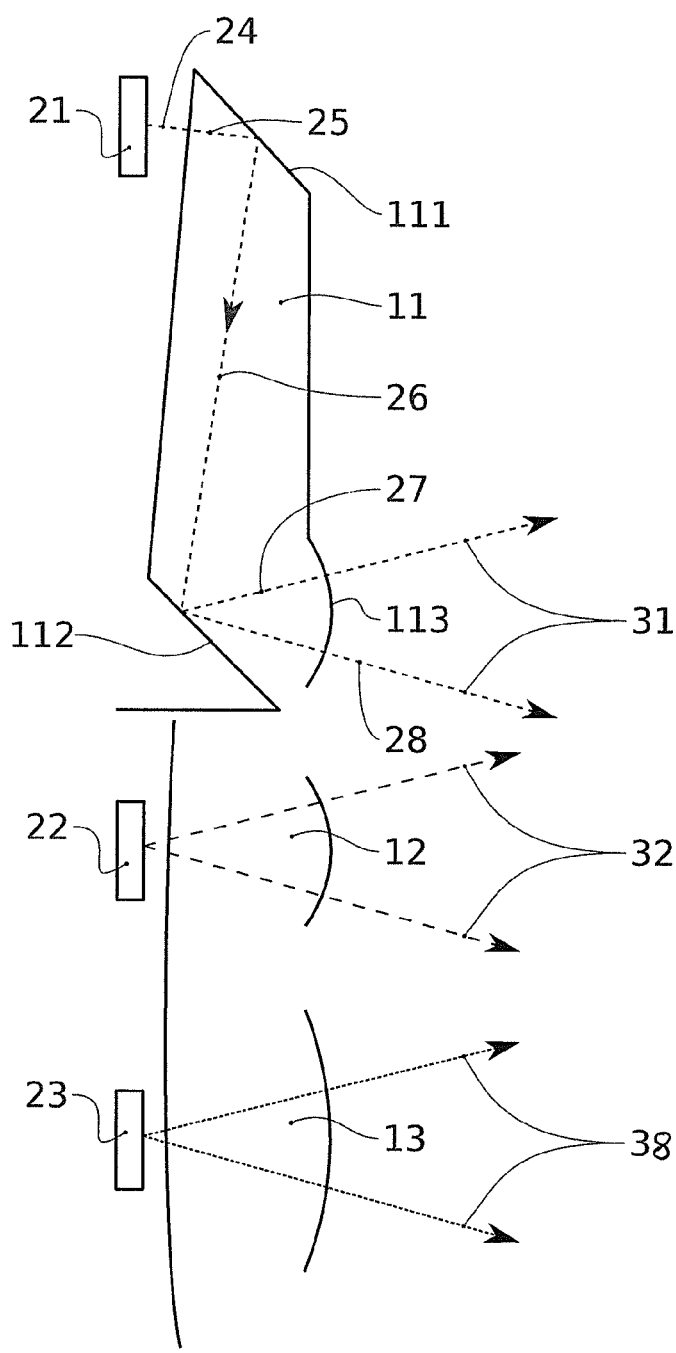

Other features and advantages of the present invention will be better understood with the aid of the description of examples and the drawings, in which:

FIG. 1 shows a first perspective view of a pair of modules according to one embodiment of the invention;

FIG. 2 presents another perspective view of the embodiment of the invention from FIG. 1;

FIG. 3 shows a front face of a lighting module according to the invention and FIG. 4 shows a rear face;

FIG. 5 presents a possible distribution of light sources in a module;

FIG. 6 is a diagram of the possibilities of projecting unitary beams produced by illumination units present, in this example, in two lighting modules used in conjunction; and FIG. 7 reveals a diagrammatic section of an optical part of a lighting module with the path of some rays.

Unless specifically indicated otherwise, technical features described in detail for a given embodiment may be combined with technical features described in the context of other embodiments described by way of nonlimiting example.

In the features described hereinafter, terms relating to verticality, horizontality and transversality (or lateral direction), or their equivalents, are understood relative to the position in which the lighting module is intended to be mounted in a vehicle. The terms "vertical" and "horizontal" are used in the present description to designate directions in accordance with an orientation perpendicular to the plane of the horizon for the term "vertical" (which corresponds to the height of the modules) and an orientation parallel to the plane of the horizon for the term "horizontal". They are to be considered under the operating conditions of the device in a vehicle. The use of these words does not mean that slight variations around vertical and horizontal directions are excluded from the invention. For example, an inclination relative to these directions of the order of + or −10° is here considered as a minor variation to preferred directions.

The module of the invention incorporates at least one row of illumination units enabling generation of a segmented type beam, but preferably also projects at least one other beam, by means of at least one other row of illumination units. The module of the invention may therefore be complex and combine a plurality of types of illumination units that may further share components.

In the context of the invention, by low beam is meant a beam employed in the presence of approaching and/or followed vehicles and/or other elements (persons, obstacles, etc.) on or near the carriageway. This beam has a downward mean direction. It may be characterized by an absence of light above a plane inclined 1% downward on the side of traffic in the other direction and another plane inclined 15° upward relative to the preceding one on the side of traffic in the same direction, these two planes defining a cut-off conforming to European regulations. This downward upper cut-off aims to prevent dazzling other users present in the road scene extending in front of the vehicle or on the verges of the road. The low beam, previously coming from a single light, has evolved, and the load beam function can be coupled with other lighting features that are still considered as low beam light functions in the sense of the present invention.

This includes in particular the following functions:

AFS (Advanced Frontlighting System) beam, which in particular offers other types of beam, in particular the BL (Bending Light) function for lighting turns, which may be broken down into a DBL (Dynamic Bending Light) function and an FBL (Fixed Bending Light) function;

Town Light beam, for lighting in town. This function widens the low beam light type beam whilst slightly reducing its range;

Motorway Light beam, which for its part produces the motorway function. This function ensures an increase in the range of a low beam light by concentrating the luminous flux from the low beam light at the level of the optical axis of the lighting device concerned;

Overhead Light beam. This function modifies a typical low beam light beam so that signalling gantries situated above the road are illuminated satisfactorily by the low beam lights;

AWL (Adverse Weather Light) beam.

The low beam light includes a differentiated lighting zone the objective of which is not to dazzle the drivers of approaching vehicles. In particular, the low beam light includes a lit zone below the cut-off line, substantially at the height level of the horizon line 36, this zone extending laterally on either side of the vehicle and covering a wide angular sector. This zone corresponds to a near field of the vehicle. It is however desirable for the low beam light also to light farther in front of the vehicle, that is to say above the horizon line 36, to offer the driver better visibility. Because of this, to satisfy at the same time the no-dazzle objective, the lighting zone above the horizon line 36 is limited laterally to limit the nuisance for oncoming vehicles. In the context of the invention, the first exit beam 33 can be used to produce the near field beam and a second exit beam 34 may be generated as a top-up thereto to form the cut-off beam. Accordingly, in this case, the first exit beam 33 is essentially projected short of the horizon line 36 whereas the cut-off beam completes it in a laterally limited portion extending above the horizon line 36.

The invention may also be used to produce a high beam. The function of the basic high beam is to light the scene facing the vehicle over a wide extent, but also over a substantial distance, typically about 200 metres. Because of its lighting function, this light beam is mainly situated above the horizon line. It may have a slightly upward lighting optical axis for example.

The device may also be used to form other lighting functions via or outside of those described above.

FIG. 1 shows an embodiment of the invention including two lighting modules 1. Although this is not limiting on the invention, the modules 1 may be identical and spaced laterally from each other, in particular by means of a separation wall 3 that extends toward the front of the modules 1. The invention potentially comprises a plurality of modules each enabling emission of at least one type of unitary beam. They are preferably juxtaposed, that is to say arranged in a horizontal alignment direction. The term module does not mean that the modules are necessarily completely separate units; they are to be understood merely as units for forming distinct beams; they may share common parts, such as a support, a projection optic or electronic components, for example control components. Apart from lighting modules 1, the device of the invention may integrate modules of other types to produce other functions.

In the case shown, each lighting module 1 comprises a support 10 carrying an optical block 14 and a printed circuit card comprising illumination control means for light sources that can be carried by the card itself. Each light source is positioned so as to generate a luminous flux entering the optical block 14 which results in projection of light, here in the direction of a field optical element 4 (which may be a biconvex lens) and then a projection optical element 2 (also preferably a lens). The latter is preferably common to the various modules 1.

In a manner known in itself, light sources are advantageously used. Generally speaking, the present invention may use light sources of the light-emitting diode type also commonly referred to as LEDs. They may equally be organic LED(s). In particular, these LEDs may be provided with at least one chip using semiconductor technology and adapted to emit light of advantageously adjustable intensity depending on the lighting and/or signalling function to be provided. Moreover, the term light source is to be understood here as a set of at least one elementary source such as an LED adapted to produce a flux leading to generation at the exit of the module of the invention at least one light beam. In one advantageous embodiment, the exit face of the source is of rectangular section, which is typical for LED chips.

As FIG. 5 shows, the light sources are preferably organized in rows. In particular, there has been shown a first row of first light sources 21 each used in conjunction with a first optical element 11 to produce a first unitary beam 31, the combination forming a first illumination unit. Also seen is a second row of second light sources 22 each used to produce in conjunction with a second optical element 12 a second unitary beam 32, the combination forming a second illumination unit. Finally, a third row of third light sources 23 is associated with third optical elements 13 to produce third unitary beams 38, the combination forming third illumination units.

Each lighting module 1 comprises a control unit adapted to activate and/or deactivate and/or modify the luminous intensity of each of the first light sources 21, second light sources 22 and third light sources 23.

In a preferred case corresponding to the illustrations, the optical elements 11, 12, 13 feature waveguides and lenses and preferably microlenses. The waveguides provide a phase of propagation of light in the optical element from an entry face and producing internal reflections. The lenses receive the light propagated in this way to project it toward the front of the optical element. A guide and a lens preferably form a pair and a single component of which they each constitute one portion. The elements 12 and 13 are lenses and preferably microlenses.

Each microlens advantageously has an exit face the dimensions of which are greater than or equal to the dimensions of the diode and less than or equal to five times the dimensions of the diode with which it is associated. They are generally of millimetre order size. For example, for an individual light-emitting diode (LED) the emitting surface of which is 1 mm on a side, for example, the dimensions of the exit face of the associated microlens will be inscribed in a square of 5 mm side maximum. Moreover, these elements may be formed by a single optical block 14 a front face of which is seen in FIG. 1 and a rear face of which is seen in FIG. 2. This may be a part made from only one optical material, for example polymethylmethacrylate. The optical elements of a given row are preferably juxtaposed edge to edge in the widthwise direction of the beam to be produced.

FIGS. 3 and 4 show more precisely one embodiment of the optical elements 11, 12, 13. In this context, the first optical elements 11 are guides and lenses juxtaposed to form a row. The orientation of this row is preferably directed perpendicularly to the optical axis and preferably parallel to the horizon line. Each includes at the level of the guide a first reflection surface 111 here in the form of a surface of the envelope of the lens that has a convex curvilinear profile. FIG. 4 shows, on the rear face of the optical block 14, the upstream part of the first optical elements 11, in particular with a second reflection surface 112. Here the latter is a continuous surface in the form of a bevel extending in the lateral direction, and advantageously also horizontally. Note also an exit diopter 113 at the level of the lens of the optical element through which the light rays exit the first optical element 11.

A second row of optical elements 12 can also be seen on the downstream face of the optical block 14 in FIG. 3, enabling viewing of the exit face for the rays from the optical element 12 and, in FIG. 4, on the upstream face of the optical block 14, making apparent the entry face for the rays from the optical element 12.

In an equivalent manner, the optical elements 13 are organized in rows as previously.

It will be noted from FIGS. 3 to 5 that it is not necessary for the number of illumination units to be identical between the first, second and third units. Moreover, it is apparent in this embodiment that the width dimension of the first illumination units is greater than that of the second illumination units, and potentially than that of the third illumination units. In this example, the width of the first illumination units is twice that of the other units. This is reflected in a greater width of the first optical elements 11 and by a greater spacing between the first sources 21. Indeed, in the context of an application to the formation of a near field beam by the first exit beam and to the formation of a cut-off beam by the second exit beam the resolution of the first exit beam generated by the combination of the first illumination units does not usually necessitate a resolution as high as that of the second exit beam.

The various rows of illumination units are preferably superposed.

There are represented in FIG. 6 examples of projection of unitary beams enabling the production of exit beams when they are combined. It will be noted that the image of the light sources is inverted in this embodiment of the modules, the first unitary beams 31, for example, being projected downward whereas the first row of sources 21 is positioned toward the top of the module.

In the upper part of FIG. 6 there has been represented a projection of all of the first unitary beams 31 and the second unitary beams 32 that can be achieved with a first module 1. There will be noted the width of the first unitary beams 31 equal to twice that of the second beams 32. There will also be noted the position of the first unitary beams 31, below the horizon line 36. Obviously, a small overlap is possible, in particular to ensure a smooth transition with the second unitary beams 32. The latter are at least mostly situated above the horizon line 36. The unitary beams 31, 32 are organized around a vertical median axis 35.

The middle part of FIG. 6 shows a projection of all the first unitary beams 31 and the second unitary beams 32 that can be achieved with a second module 1. The horizon line 36 and the median axis 35 are also shown so as to indicate the position of the beams produced by this second module 1 relative to those produced by the first module 1. In particular, note a lateral offset of the beams produced by the two modules 1. Where the second beams 32 are concerned, this enables a smaller increment of definition of a lateral cut-off edge 37 (potentially divided by two). FIG. 6 shows this principle of reduction of the increment by the dimensions "p" corresponding to the offset increment of the second beams. For the first beams 31, this offset enables overlapping of the first beams 31 smoothing the transitions between the unitary beams emitted by the two modules. There is advantageously no vertical offset between the beams emitted by the two modules 1. When they are controlled in an equivalent manner the latter therefore enable the overall luminous intensity to be increased.

The bottom part of FIG. 6 is an example of exit beams resulting from how the two modules 1 are controlled. In this case, all of the first unitary beams 31 are emitted, by turning on all the sources 21, so as to produce the first exit beam 33, which in the example is a near field beam. Some of the second unitary beams 32 are also active, by turning on a selection of sources 22, so as to produce the second exit beam 34. It is clear from FIG. 6 that the selection of the sources 22 corresponds to a plurality of juxtaposed first sources; by avoiding turning on all the second sources 22, the illumination above the horizon line 36 is confined to a required sector, avoiding dazzling an oncoming vehicle. Note that the lighting device advantageously also comprises means for controlling the turning on of the LED, in particular for the second row of second light sources 22, by slaving them to a sensor of a motor vehicle trajectory parameter. The sensor advantageously supplies a rotation angle of a steering wheel of the motor vehicle, the trajectory parameter indicating a deviation of a road on which the vehicle is travelling relative to a straight line, such as, in particular, a turn. The present invention therefore has the advantage of being able to generate a light beam for a low beam light the cut-off on which follows the trajectory of the vehicle on a winding road, because the beam is discretely divided into portions corresponding to the second unitary beams 32.

FIG. 7 shows in detail the path of the light rays coming from the light sources. Where the first illumination units are concerned, each first source 21 has an emission face through which emitted beams 24 enter the first optical element 11 through an entry face of the latter. That entry face is shown plane in FIG. 7 for simplicity but it is advantageously slightly convex so as to produce a domed shape in the direction of the source, that domed shape preferably being centred on the median emission axis of the source. The rays reach the first reflection surface 111 which here is positioned facing the face of the source 21. The first reflection surface 111 is advantageously configured to collimate the rays 25 and to direct them, in the form of reflected rays 26, toward a second reflection surface 112. According to the invention, the reflections that occur in the first optical element 11 are total internal reflections; the angles and the indices of the materials are therefore configured to produce these reflections. After impacting on the second reflection surface 112, the reflected rays 27 propagate in the direction of an exit diopter 113 to produce the first unitary beam 31. The diopter 113 is advantageously domed in a complex manner, and possibly of part-spherical shape, so as to spread the beam 31, in particular in the lateral direction to produce a good homogeneity of illumination of the plurality of beams 31 emitted concomitantly. Moreover, the optical element 11 is advantageously configured to produce a decrease of illumination in the beam 31 toward the bottom; the illumination is at a maximum at the level of the horizon line 36.

FIG. 7 moreover shows diagrammatically the generation of the second unitary beam 32. Emitted by a second light source 22 an exit face of which is placed facing a first optical element 12, the light passes through the optical element 12 to reach an exit diopter of the latter, to generate the beam 32. As in the case of the optical element 11, the exit diopter of the element 12 may be domed in a complex manner, and possibly of part-spherical shape, so as to produce a required spreading of the second beam 32.

A third unitary beam 38 is shown in FIG. 7 based on a third light source 23 an emission face of which is placed facing an entry face of a third optical element 13; the light passes through the optical element 13 to an exit diopter that may be domed in a convex manner, and possibly of part-spherical shape, so as to produce a required spreading of the third unitary beam 38. In one embodiment, the third unitary beams 38 provide a high beam top-up function, the resulting third exit beam being mainly directed above the horizon line 36.

The invention is not limited to the embodiments described and encompasses any embodiment conforming to its spirit.

REFERENCES 1. lighting module
2. projection optical element 3. separation wall
4. field optical element
10. support
11. first optical element
   111. first reflection surface
   112. second reflection surface
   113. exit diopter
12. second optical element
13. third optical element
14. optical block
21. first source
22. second source
23. third source
24. emitted ray
25. entry ray
26. reflected ray
27. reflected ray
28. exit ray
31. first unitary beam
32. second unitary beam
33. first exit beam
34. second exit beam
35. median axis
36. horizon line
37. cut-off edge

The invention claimed is:

1. Lighting module for motor vehicles, comprising at least one first row of first illumination units configured to produce a first exit beam, each first illumination unit comprising a first light source and a first optical element configured to produce a first unitary beam from light rays coming from the first light source, wherein the first optical element of each of the first illumination units is configured to produce:
   a first total internal reflection of the rays coming from the first light source so as to reflect and collimate the rays from the first light source to form a reflected beam; and
   a second total internal reflection of the reflected beam so as to generate the first unitary beam.

2. Module according to claim 1, wherein the first optical elements form an assembly of a monobloc component made from a single material.

3. Module according to claim 1, wherein the second internal reflection is configured to spread the first unitary beam in a lateral direction perpendicular to a heightwise direction of the module.

4. Module according to claim 1, wherein the internal reflections are configured to generate a decrease of brightness toward the bottom of the first unitary beam.

5. Module according to claim 1, wherein the first exit beam is a near field beam of a low beam light.

6. Module according to a claim 1, comprising a second row of second illumination units configured to produce a second exit beam, each second illumination unit comprising a second light source and a second optical element configured to produce a second unitary beam from light rays coming from the second light source.

7. Module according to claim 6, wherein the width of the first unitary beam is equal to twice the width of the second unitary beams.

8. Module according to claim 6 wherein the second exit beam is a cut-off beam of the low beam light.

9. Motor vehicle lighting and/or signalling device equipped with at least one module according to claim 1.

10. Device according to claim 9, comprising at least two modules, the modules being configured to form overlapping first exit beams.

11. Device according to claim 10, wherein the first beams from a first of the at least two modules are offset laterally from the first exit beams of a second of the at least two modules.

12. Lighting module for motor vehicles, comprising at least one first row of first illumination units configured to produce a first exit beam, each first illumination unit comprising a first light source and a first optical element configured to produce a first unitary beam from light rays coming from the first light source, wherein the first optical element of each of the first illumination units is configured to produce:
   a first total internal reflection of the rays coming from the first light source so as to form a reflected beam of collimated rays;
   a second total internal reflection of the collimated rays so as to generate the first unitary beam,
   wherein the first optical element comprises a waveguide configured to produce the first internal reflection and the second internal reflection.

13. Module according to claim 12, wherein the waveguide comprises a first reflection surface receiving the rays coming from the first light source from an entry diopter of the waveguide and producing the first total internal reflection in the direction of the second reflection surface receiving the collimated rays and producing the second total internal reflection to generate the first unitary beam.

14. Module according to claim 13, wherein the first surface and the second surface are offset in a heightwise direction of the module.

15. Module according to claim 14, wherein the first surface is situated above the second surface in the heightwise direction of the module.

16. Module according to claim 14, wherein the second reflection surface is a continuous surface.

17. Module according to claim 13, wherein the second reflection surface is a continuous surface.

18. Module according to claim 17, wherein the continuous surface is common to the waveguides of each of the first illumination units.

19. Module according to claim 12, wherein the first optical elements form an assembly of a monobloc component made from a single material.

20. Module according to claim 12, wherein the second internal reflection is configured to spread the first unitary beam in a lateral direction perpendicular to a heightwise direction of the module.

* * * * *